(12) United States Patent
Eisner

(10) Patent No.: US 11,161,654 B2
(45) Date of Patent: Nov. 2, 2021

(54) CAP FOR AUTOMATIC ORIFICE BLOCKING

(71) Applicant: Group B Labs, Inc., Seattle, WA (US)

(72) Inventor: Illi Eisner, Seattle, WA (US)

(73) Assignee: Group B Labs, Inc., Seattle, WA (US)

( * ) Notice: Subject to any disclaimer, the term of this patent is extended or adjusted under 35 U.S.C. 154(b) by 0 days.

(21) Appl. No.: 16/834,739

(22) Filed: Mar. 30, 2020

(65) Prior Publication Data

US 2020/0307871 A1 Oct. 1, 2020

Related U.S. Application Data

(60) Provisional application No. 62/826,367, filed on Mar. 29, 2019.

(51) Int. Cl.
*B65D 47/06* (2006.01)
*B65D 47/32* (2006.01)
*B65D 51/24* (2006.01)

(52) U.S. Cl.
CPC ............ *B65D 47/06* (2013.01); *B65D 47/32* (2013.01); *B65D 51/24* (2013.01)

(58) Field of Classification Search
CPC .... B65D 47/06; B65D 47/032; B65D 47/265; B65D 51/24; G01C 19/20; A47G 19/2272

USPC .... 222/52, 63, 566–570; 220/703, 711, 713, 220/717, 725–727
See application file for complete search history.

(56) References Cited

U.S. PATENT DOCUMENTS

| | | | | |
|---|---|---|---|---|
| 5,294,014 | A * | 3/1994 | Wyatt | B65D 47/265 220/253 |
| 8,393,487 | B1 * | 3/2013 | Pillers | B65D 47/265 220/253 |
| 10,561,262 | B2 * | 2/2020 | Phan | B65D 51/1644 |
| 2016/0122090 | A1 * | 5/2016 | Cote, Sr. | A47G 19/2272 220/323 |
| 2017/0027350 | A1 * | 2/2017 | Onza | B65D 47/265 |
| 2018/0305091 | A1 * | 10/2018 | Krafft | B65D 43/26 |
| 2019/0352059 | A1 * | 11/2019 | Mutch | A47G 19/2272 |

* cited by examiner

*Primary Examiner* — Lien M Ngo
(74) *Attorney, Agent, or Firm* — McIver IP, PLLC

(57) ABSTRACT

Apparatuses, devices, and systems for selectively blocking an orifice of a container are disclosed herein. In one embodiment, a cap affixed to a container can comprise a spout comprising a spout orifice that can be selectively blocked and unblocked by a blocker. The blocker can be coupled to a blocker mover component that can be configured to move the blocker between blocked and unblocked positions in response to a blocker control signal generated by a cap control component. The cap control component can be configured to generate the blocker control signal based at least in part on input from a cap sensor configured to sense a condition of the container.

20 Claims, 15 Drawing Sheets

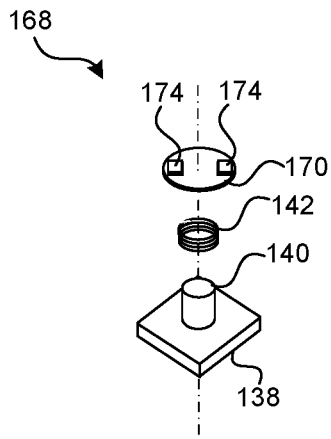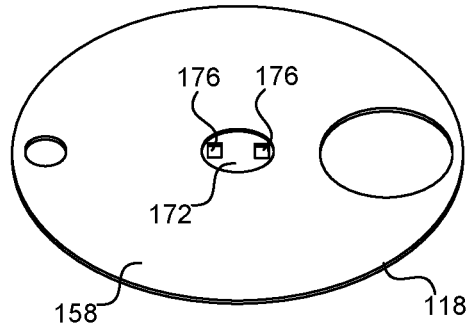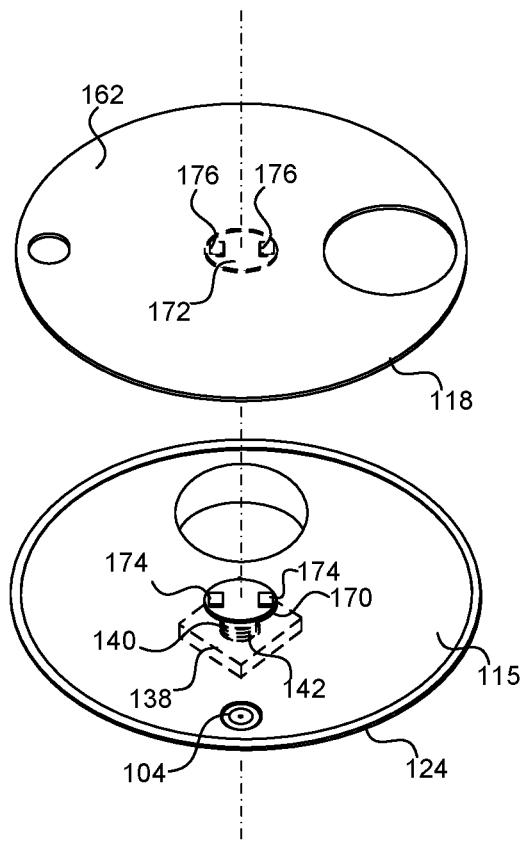
*Fig. 15A*
*Fig. 15B*
*Fig. 15C*

CAP FOR AUTOMATIC ORIFICE BLOCKING

CROSS-REFERENCE TO RELATED APPLICATION

This application claims priority to and the benefit of U.S. Provisional Patent Application No. 62/826,367, entitled "SmartCap," filed Mar. 29, 2019, which is hereby incorporated by reference in its entirety.

BACKGROUND

A container for holding a liquid can be blocked at an orifice to prevent its contents from spilling through the orifice. A container can comprise a cap that can be configured to block the container orifice. Single-use plastic bottles, for instance, typically include a screw-on plastic cap. Some caps can comprise a pop-top, flip-top, screw-top, folding straw, or the like, which can be configured to block or open an orifice of a container.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A cap is often used for blocking an orifice of a container that has an internal volume. A cap can be attached and removed from a container to respectively block and unblock the orifice to the internal volume of the bottle. In some circumstances, it can be cumbersome or inconvenient to remove a cap from a container. For example, for a person drinking frequently from a water bottle, unscrewing and screwing a cap for each sip can be tedious, and the person may choose to not reapply the cap between sips, which can increase the risk of spilling the contents of the bottle.

Some containers can be configured comprising a cap that provides for more convenient blocking and unblocking of a container orifice. For example, many durable containers are configured comprising a cap comprising a spout that can be blocked or unblocked. Example caps comprising a spout that can be blocked and unblocked include caps comprising a pop-cap spout, a flip-top, or a folding straw. However, conventional caps that are configured for blocking and unblocking an orifice are often inadequate because they are prone to leaking contents of an attached container. Furthermore, conventional caps that are configured for blocking and unblocking an orifice are typically not durable for repeated use. Additionally, a conventional cap configured to block and unblock an orifice can empty a container's contents if mistakenly left in an unblocked state.

Several embodiments of the disclosed technology can selectively block and unblock an orifice of a container. Several embodiments of the disclosed technology can automatically block an orifice of a container from an unblocked state to prevent spillage from the container. Several embodiments of the disclosed technology can automatically unblock an orifice of a container for consumption by a person from the container via the orifice. Several embodiments of the disclosed technology can automatically toggle between blocking an orifice of a container and unblocking the orifice based at least in part on a determined condition of the container.

Several embodiments of the disclosed technology comprise a cap configured to be attached at an orifice of a container to selectively block and unblock the orifice from passing contents of an internal volume of the container. Several embodiments of the disclosed technology comprise a cap comprising a blocker configured to automatically be toggled from a blocked state to an unblocked state. Several embodiments of the disclosed technology comprise a cap configured to determine a condition of a container to which the cap is attached and selectively toggle between a blocked and an unblocked state based at least in part on the condition of the container.

A cap according to embodiments of the disclosure can comprise a spout comprising a spout orifice that can be selectively blocked and unblocked by a blocker. The cap can be configured to be attached at an orifice of a container, and the spout can accordingly be configured to selectively block and unblock the orifice of the container. In some embodiments, the blocker can comprise a disc including a spout hole configured to align concentrically with the spout orifice when the cap is in an unblocked state, enabling the spout orifice to pass contents of an internal volume of the container. The blocker can be configured, when in a blocked position, to block the spout orifice when the cap is in a blocked state, thereby blocking contents from passing through the orifice from the internal volume of the container.

The cap can be configured to comprise a blocker mover component configured to force the blocker to move between the blocked position and the unblocked position. The cap can be configured to comprise a cap controller component configured to control the blocker mover component. The cap controller component can be configured to comprise a processor and a memory. The cap can comprise at least one sensor, and the cap controller component can be configured to receive input from the at least one sensor. In some embodiments, the cap controller component can be configured to determine a condition of a container based at least in part on the received input from the at least one sensor. In some embodiments, the cap controller component can be configured to cause the blocker mover component to toggle the blocker between the blocked position and the unblocked position based at least in part on the determined condition of the container. In some embodiments, the cap controller component can be configured to generate a blocking signal for controlling the blocker mover component. In some embodiments, the cap can comprise an equalization vent, and the blocker can be configured to selectively block and unblock the equalization vent as well as the spout orifice.

A benefit according to several embodiments is that a cap for selectively blocking an orifice of a container can be configured to automatically block the orifice to prevent spillage. Another benefit according to several embodiments of the disclosure is that the cap for selectively blocking an orifice of a container can be configured to open the orifice for allowing contents of an internal volume of the container to pass through the orifice, such as for consumption of the contents.

BRIEF DESCRIPTION OF THE DRAWINGS

FIGS. 13A-C are schematic isometric views of a blocker mover component comprising a magnet and motor, a blocker, and a top interior of a cap, in accordance with embodiments of the disclosed technology.

FIGS. 14A-C are schematic isometric views of a blocker mover component comprising an electromagnet, a blocker, and a top interior of a cap, in accordance with embodiments of the disclosed technology.

FIGS. 15A-C are schematic isometric views of a blocker mover component comprising a physical attachment mechanism and a motor, a blocker, and a top interior of a cap, in accordance with embodiments of the disclosed technology.

DETAILED DESCRIPTION

Certain embodiments of apparatuses, systems, devices, components, modules, for automatically blocking or unblocking an orifice of a container are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-17.

As used herein, the term "blocked" or "blocking" generally refers to an orifice being physically blocked such that contents in an internal volume of a container, such as a liquid, are restricted from passing from the internal volume through the orifice. An equalization vent of a cap can be blocked by being physically blocked from passing a gas or liquid. A cap is in a blocked state when a blocker of the cap is in a blocked position, thereby blocking the orifice and/or equalization vent.

As used herein, the term "unblocked" generally refers to an orifice being open such that contents in an internal volume of a container, such as a liquid, are unrestricted from passing from the internal volume of the container through the orifice. An equalization vent of a cap can be unblocked when it is unrestricted from passing a gas and/or liquid between the internal volume of the container and outside the container.

Figure 1:
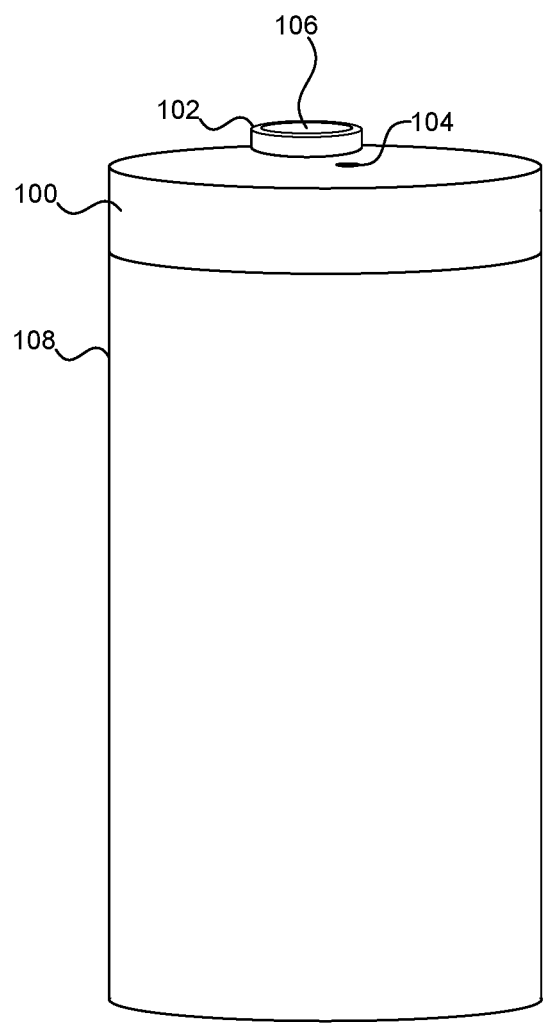
FIG. 1 is a schematic perspective view of a cap configured affixed to a container, in accordance with embodiments of the disclosed technology

FIG. 1 is a schematic perspective view of a cap 100 comprising a spout 102. The spout 102 comprises a spout orifice 106 that opens to an internal volume (not shown) of a container 108, to which the cap is releasably attached, when the cap 100 is in an unblocked state. The spout 102 can be configured, when in the unblocked state, to pass contents of the internal volume of the container 108 to outside the internal volume of the container 108 via the spout orifice 106. The container 108 can comprise a baby bottle, a water bottle, beverage travel mug, or the like. U.S. patent application Ser. No. 16/040,523, entitled LIQUID FOOD ITEM PRESERVATION AND PREPARATION, filed Jul. 19, 2018, which is hereby incorporated by reference in its entirety, discloses a suitable container for the container 108.

As shown in FIG. 1, in some embodiments, the cap 100 can be configured to comprise an equalization vent 104. The equalization vent 104 can be configured to pass a gas, when the cap 100 is in an unblocked state, to and from the internal volume of the container 108, including when liquid is poured out the spout orifice 106.

The cap 100 can be configured to comprise at least one blocker (not shown) configured to selectively block and unblock the spout orifice 106 and the equalization vent 104. The cap 100 can be configured such that when the at least one blocker is in a blocked state, the at least one blocker blocks the spout orifice 106 from passing contents of the internal volume of the container 108 to a location external the container 108. Likewise, when in the blocked state, the cap can be configured such that the at least one blocker blocks the equalization vent 104 from allowing air to pass into the internal volume of the container 108, and likewise, contents of the container 108 from passing from the internal volume of the container 108 through the equalization vent 104 to a location outside of the container 108. In some embodiments, the equalization vent 104 can be configured to allow a gas to exit the internal volume of the container 108 while preventing a liquid from exiting the internal volume of the container 108 while in the blocked state.

In some embodiments, the container 108 and/or the cap 100 can comprise at least one sensor (not shown) and a cap controller component (not shown), comprising a processor and a memory, configured to determine a condition of the cap 100 and/or the container 108, and the cap 100 can be configured to automatically block and unblock the sprout orifice 106 using the at least one blocker (not shown), based at least in part on the determined condition of the cap 100 and/or container 108.

Figure 2:
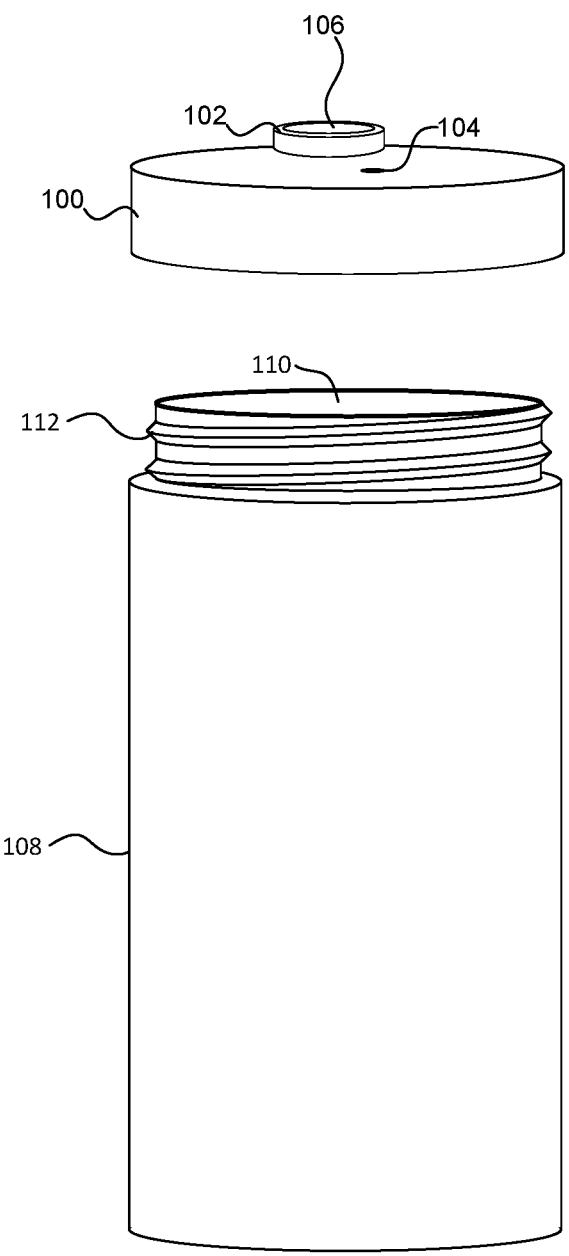
FIG. 2 is a schematic perspective view of a cap configured unaffixed to a container, in accordance with embodiments of the disclosed technology.

FIG. 2 shows a schematic perspective view of the cap 100 and the container 108 unattached from each other. The container 108 comprises a container orifice 110 to a liquid holding volume (not shown) of the container 108. The container 108 comprises a container affixing component 112 comprising threads that is configured to be releasably attached with the cap 100 via a cap affixing component (not shown) of the cap 100. In some embodiments, the cap 100 and container 108 can be configured to attach via another attachment component. For example, in some embodiments, the cap 100 and container 108 can be configured to attach via a hinge, clamp, and/or a friction stopper.

In some embodiments, the cap 100 and the container 108 can comprise a single device. For example, in some embodiments, the container 108 can be configured to comprise a permanent cap 100 comprising a blocker (not shown) that selectively blocks an orifice of the container 108.

Figure 3:
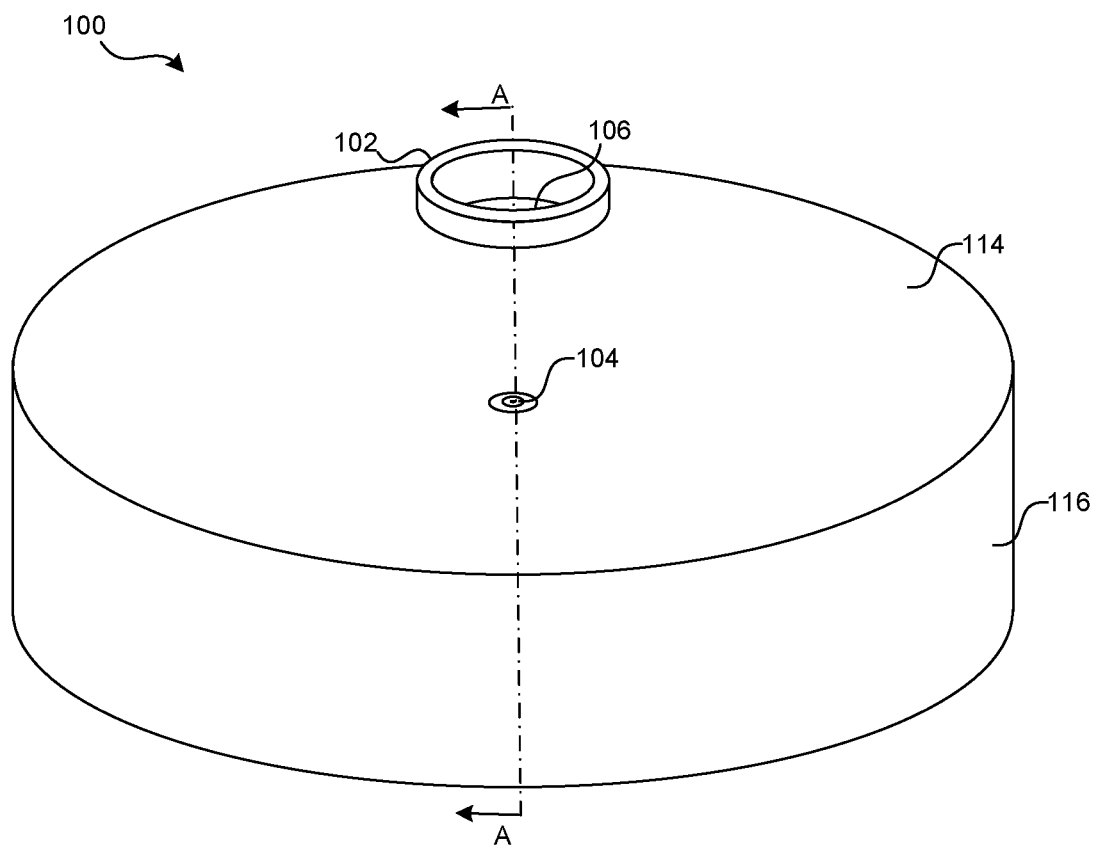
FIG. 3 is a schematic isometric view of a cap showing a top exterior and side wall, in accordance with embodiments of the disclosed technology.

FIG. 3 shows a schematic isometric view of the cap 100 showing a top exterior 114 of the cap 100 and a side wall 116 of the cap 100. As shown in FIG. 3, the top exterior 114 of the cap 100 can be configured to comprise the spout 102, including the spout orifice 106, and the equalization vent 104. In some embodiments, the top exterior 114, side wall 116, and spout 102 can be composed of plastic, such as polyethylene terephthalate ("PETE" or "PET") or high-density polyethylene ("HDPE") plastic.

Figure 4:
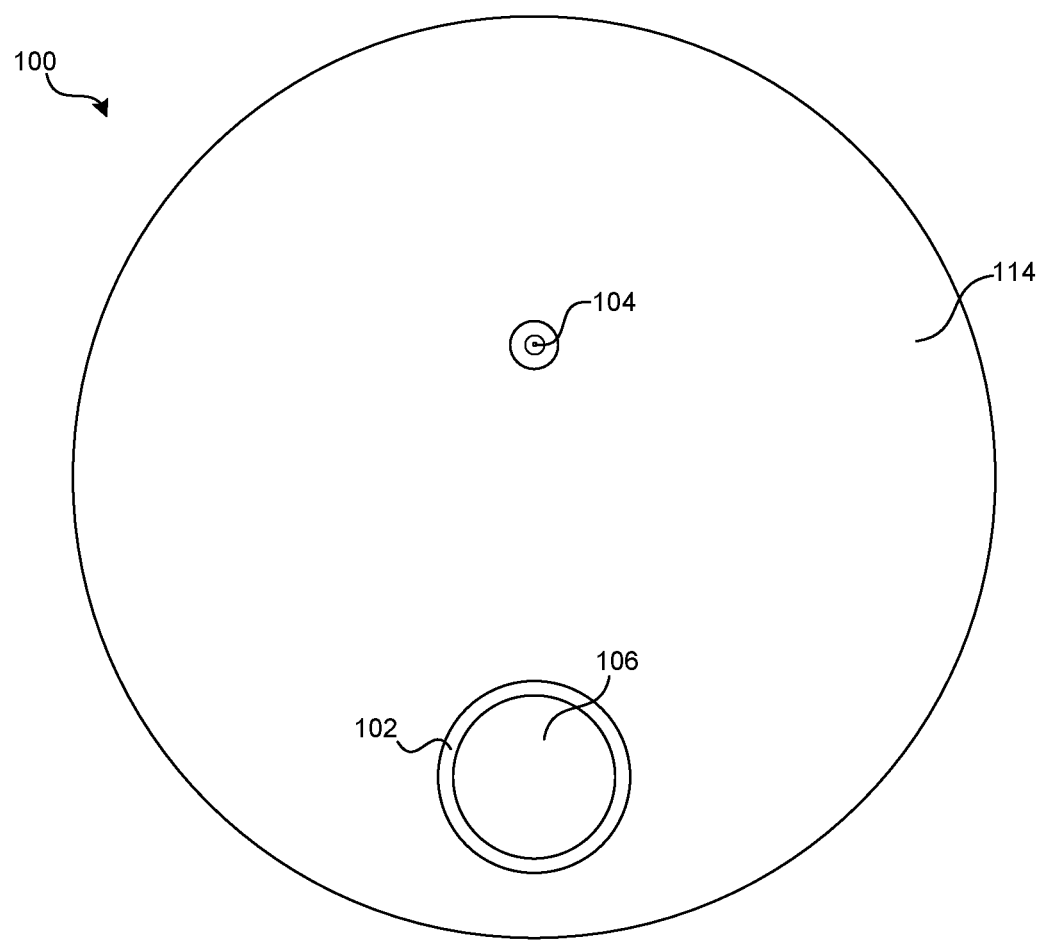
FIG. 4 is a schematic top plan view of a cap configured to selectively block an orifice, in accordance with embodiments of the disclosed technology.

FIG. 4 shows a schematic top plan view of the cap 100. In some embodiments, the cap 100 can comprise a cylindrical shape, and, accordingly, the cap 100 can appear circular in the top plan view. As shown in FIG. 4, in some embodiments, the spout 102 can be configured near an edge of the top exterior 114. In some embodiments, the spout 102 can be configured elsewhere on the top exterior 114, such as at a centroid of the top exterior 114 in the top plan view. As shown in FIG. 4, the spout 102 can be configured to comprise a cylinder, and, accordingly, spout 102 appears circular in the top plan view.

Figure 5:
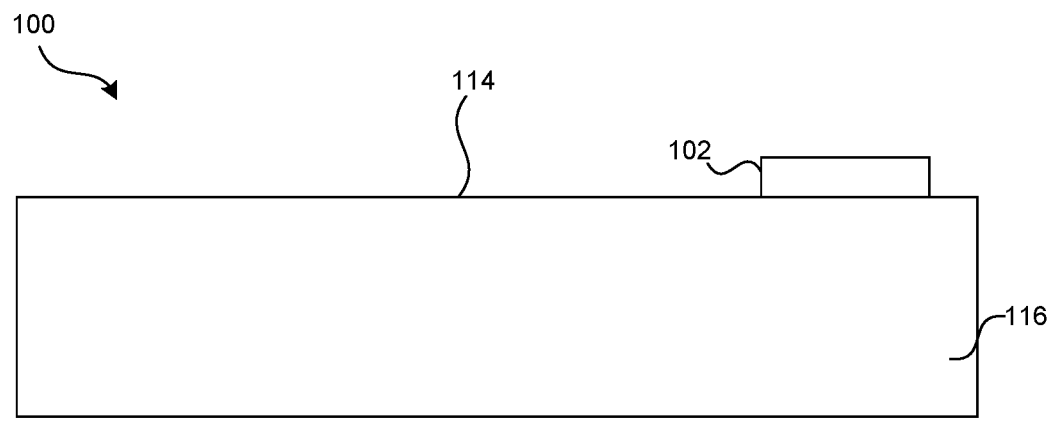
FIG. 5 is a schematic side plan view of a cap configured to selectively block an orifice, in accordance with embodiments of the disclosed technology.

FIG. 5 is a schematic side plan view of the cap 100. FIG. 5 shows the side wall 116 and the spout 102 extending from the top exterior 114.

Figure 6A:
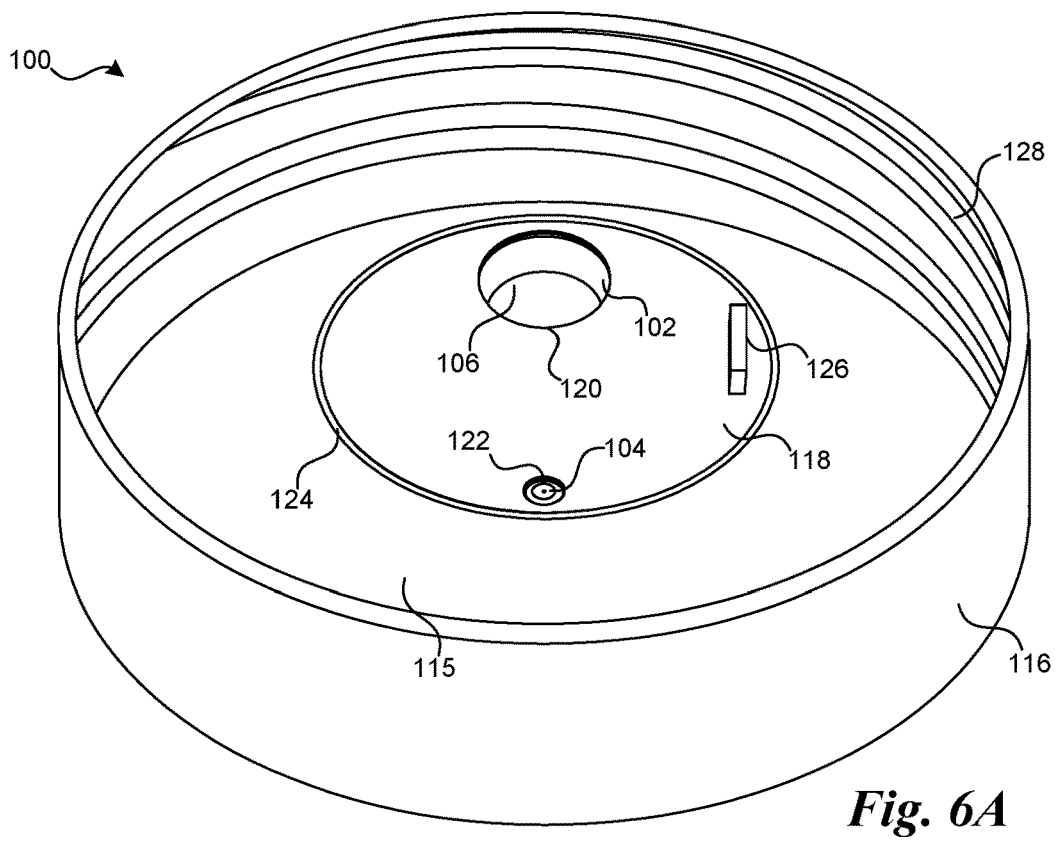
FIG. 6A is a schematic isometric view of a cap configured in an unblocked state showing a top interior and side wall of the cap, among other components, in accordance with embodiments of the disclosed technology.

FIG. 6A is a schematic isometric view of the cap 100, showing a top interior 115 of the cap 100, in an unblocked state. FIG. 6A shows the exterior of the side wall 116 of the cap 100 in the foreground and an interior of the side 116 of the cap 100 in the background. The top interior 115 of the cap 100 comprises a blocker 118 and a blocker guide 124. The interior of the side wall 116 of the cap 100 comprises a cap affixing component 128 comprising threads that can be configured to attach to the container affixing component (not shown) for releasably attaching the cap 100 to the container 108. In some embodiments, the affixing component 128 can comprise a different type of affixing component than that shown in FIG. 6A. For example, in some embodiments, the affixing component 128 can comprise a friction stopper. In some embodiments, the blocker 118 can comprise a disc comprising plastic, such as polyethylene terephthalate (PETE or PET) or high-density polyethylene (HDPE) plastic.

As shown in FIG. 6A, in some embodiments, the blocker 118 can be configured to comprise a spout hole 120 and an equalization vent hole 122. In an embodiment without the equalization vent 104, the blocker 118 can be configured without the equalization vent hole 122. The cap 100 shown in FIG. 6A is in an unblocked state. Accordingly, the blocker 118 is in an unblocked position, with the spout hole 120 of the blocker 118 configured concentrically with the spout orifice 106 of the spout 102, and the equalization vent hole 122 configured concentrically with equalization vent 104.

In some embodiments, as shown in FIG. 6A, the blocker 118 can be configured to comprise a blocker handle 126. The blocker handle 126 can be configured such that a person can use the blocker handle 126 to remove the blocker 118 from the cap 100, such as for cleaning.

In some embodiments, the blocker 118 can be configured to rotate between an unblocked position and a blocked position. The cap 100 can comprise a blocker mover component (not shown) configured to rotate the blocker 118. In some embodiments, the blocker mover component can be configured, at least in part, in a cap compartment (not shown) that is configured between the top interior 115 and the top exterior (not shown in FIG. 6A) of the cap 100.

As shown in FIG. 6A, in some embodiments, the cap 100 can comprise the blocker guide 124 configured on a surface of the top interior 115 and concentric with the blocker 118. In some embodiments, the blocker guide 124 can be configured to comprise a raised track configured on the surface of the top interior 115 of the cap 100. In some embodiments, the blocker guide 124 can comprise a circular interior having a radius that is slightly greater than a radius of the blocker 118. The blocker guide 124 can be configured to prevent the blocker 118 from sliding horizontally relative to the top interior 115 on the surface of the top interior 115.

Figure 6B:
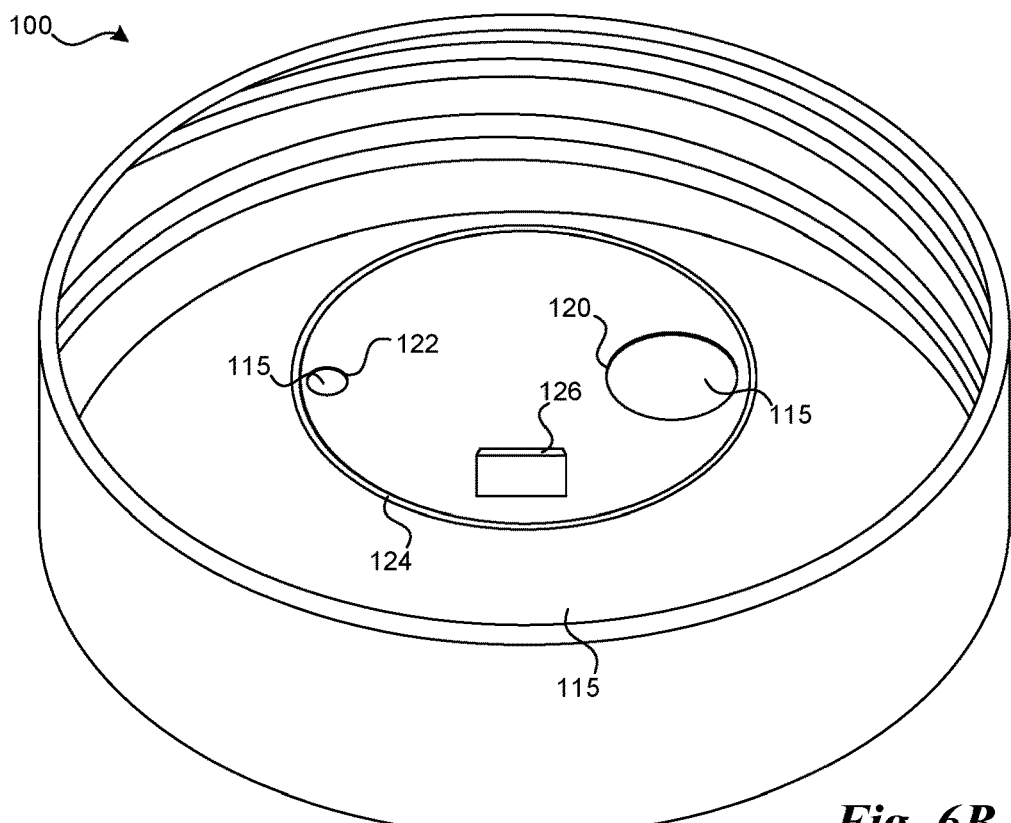
FIG. 6B is a schematic isometric view of a cap configured in a blocked state showing a top interior and side wall of the cap, among other components, in accordance with embodiments of the disclosed technology.

FIG. 6B is a schematic isometric view of the cap 100 in a blocked state. As shown in FIG. 6B, the blocker 118 is rotated clockwise by approximately 90 degrees relative to when the cap 100 is in the unblocked state. The cap 100 is configured such that in the blocked state, the blocker 118 blocks the spout orifice (not shown in FIG. 6B) and the equalization vent (not shown in FIG. 6B). Accordingly, as shown in FIG. 6B, the spout hole 120 is not aligned with the spout orifice (not shown in FIG. 6B) and the equalization vent hole 122 is not aligned with the equalization vent (not shown in FIG. 6B). Instead, the spout hole 120 and equalization vent hole 122 align with the top interior 115. In some embodiments, the blocker mover component (not shown) of the cap 100 can be configured to rotate the blocker 118 by an amount greater than or less than 90 degrees relative to the blocker 118 when in an unblocked state.

Figure 7A:
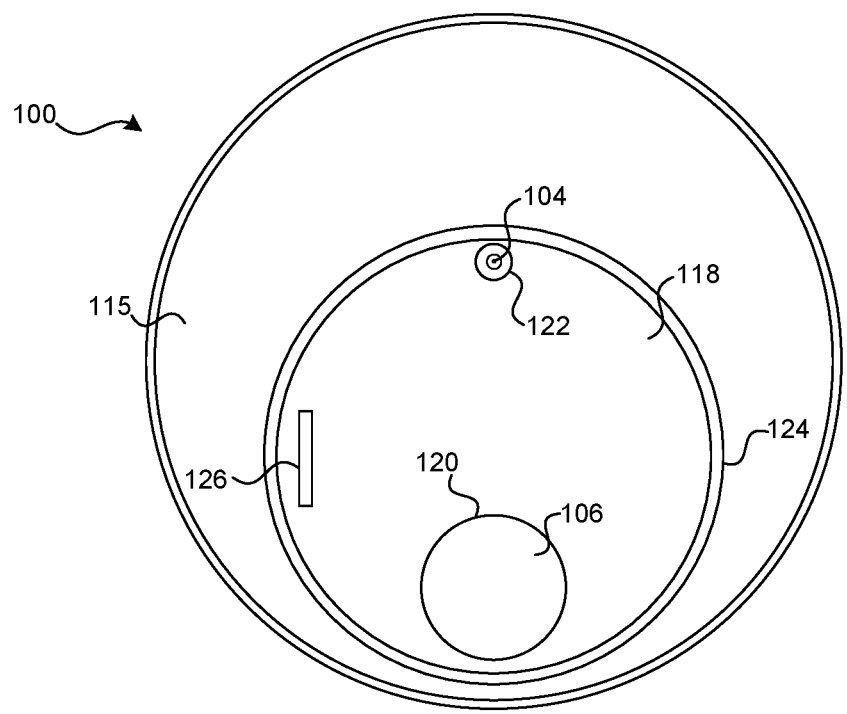
FIG. 7A is a schematic bottom plan view of a cap configured in an unblocked state showing a top interior, in accordance with embodiments of the disclosed technology.

FIG. 7A is a schematic bottom plan view of the cap 100 in an unblocked state, showing a top interior 115 of the cap 100. As shown in FIG. 7A, the blocker 118 is configured within the blocker guide 124 and rotated to an angle such that the spout hole 120 of the blocker is concentric with the spout orifice 106, and the equalization vent hole 122 is concentric with the equalization vent 104.

Figure 7B:
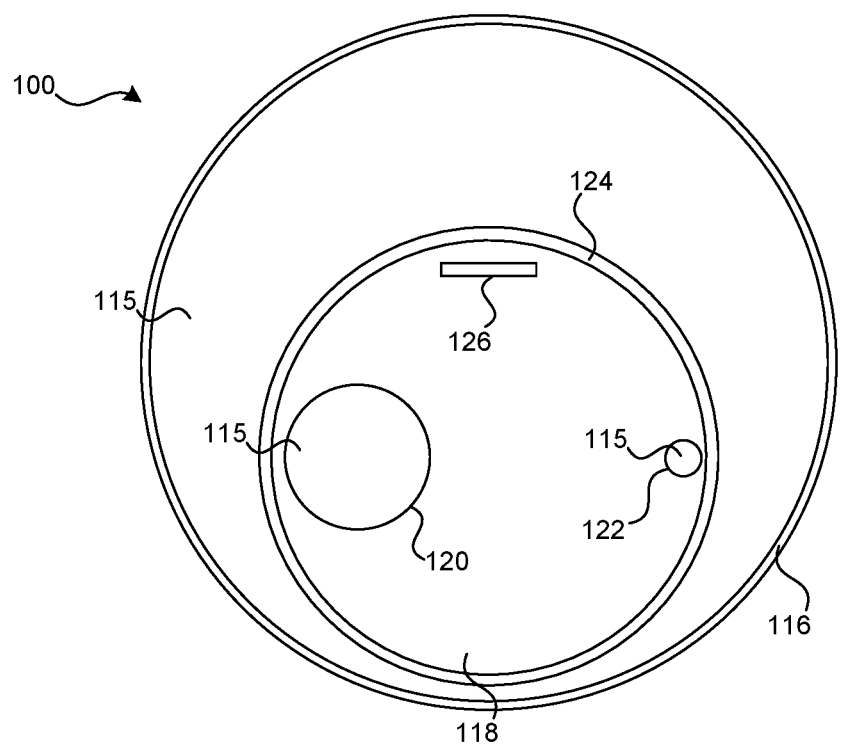
FIG. 7B is a schematic bottom plan view of a cap configured in a blocked state showing a top interior, in accordance with embodiments of the disclosed technology.

FIG. 7B is a schematic bottom plan view of the cap 100 in a blocked state, showing a top interior 115 of the cap 100. As shown in FIG. 7B, the blocker 118 is configured within the blocker guide 124 and rotated about 90 degrees clockwise relative to the blocker 118 when the cap 100 is in the unblocked state. As shown in FIG. 7B, the cap 100 can be configured such that in the blocked state the blocker 118 blocks the spout orifice (not shown in FIG. 7B) and the equalization vent hole 122 (not shown in FIG. 7B).

Figure 8:
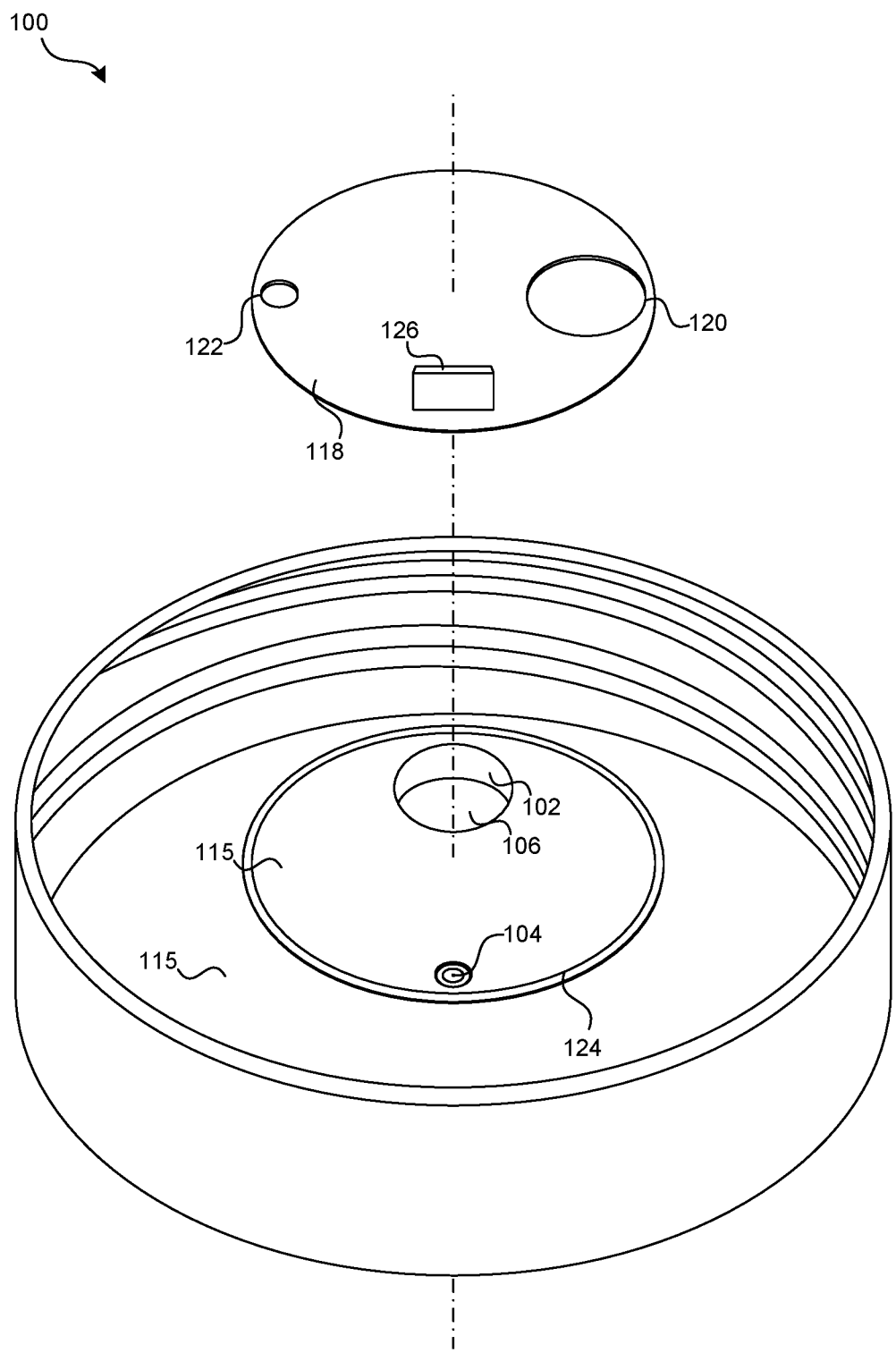
FIG. 8 is a schematic perspective isometric view of a cap and a blocker of the cap, in accordance with embodiments of the disclosed technology.

FIG. 8 is a schematic exploded isometric view of the cap 100 showing the blocker 118 removed from the cap 100. A user of the cap 100 can remove the blocker 118 by pulling the blocker 118 away from the cap 100 using the blocker handle 126. As shown in FIG. 8, in some embodiments, the blocker 118 can be configured to comprise a disc. The blocker 118 comprises the spout hole 120 and the equalization vent hole 122. The blocker 118 also includes the blocker handle 126. The cap 100 comprises the blocker guide 124 configured on a surface of the top interior 115 of the cap 100. The cap 100 also includes the spout 102, comprising the spout orifice 106, which extends from the top interior 115 of the cap 100 to the top exterior (not shown) of the cap 100. The cap 100 also includes the equalization vent 104, which extends from the top interior 115 of the cap 100 to the top exterior (not shown).

As shown in FIG. 8, the blocker 118 can be arranged adjacent to the top interior 115 when configured within the blocker guide 124 of the cap 100, where the blocker 118 can be configured to rotate between the blocked and unblocked positions. The cap 100 can include a blocker attachment component (not shown) configured to attach the cap 100 and the blocker 118.

In some embodiments, as shown in FIG. 8, the blocker 118 can be releasably attached to the cap 100. For example, the cap 100 can be configured to comprise a cap attachment component (not shown) that can be configured to hold the blocker 118 against the top interior 115 of the cap 100 within the area of the blocker guide 124, but release the blocker 118 when a force is exerted pulling the blocker handle 126 and thus the blocker 118 away from the top interior 115 of the cap 100. In some embodiments, the blocker 118 comprises a blocker attachment component (not shown) that the cap attachment component (not shown) can be configured to couple with to hold the blocker 118 against the top interior 115 of the cap 100. In some embodiments, the cap attachment component (not shown) can also exert a force on the blocker 118 via the blocker attachment component (not shown) for rotating the blocker 118 between a blocked position and an unblocked position. In some embodiments, the cap attachment component (not shown) can comprise a magnet. In some embodiments, the blocker attachment component (not shown) can comprise a magnet that is magnetically coupled to the magnet of the cap attachment component (not shown).

Figure 9A:
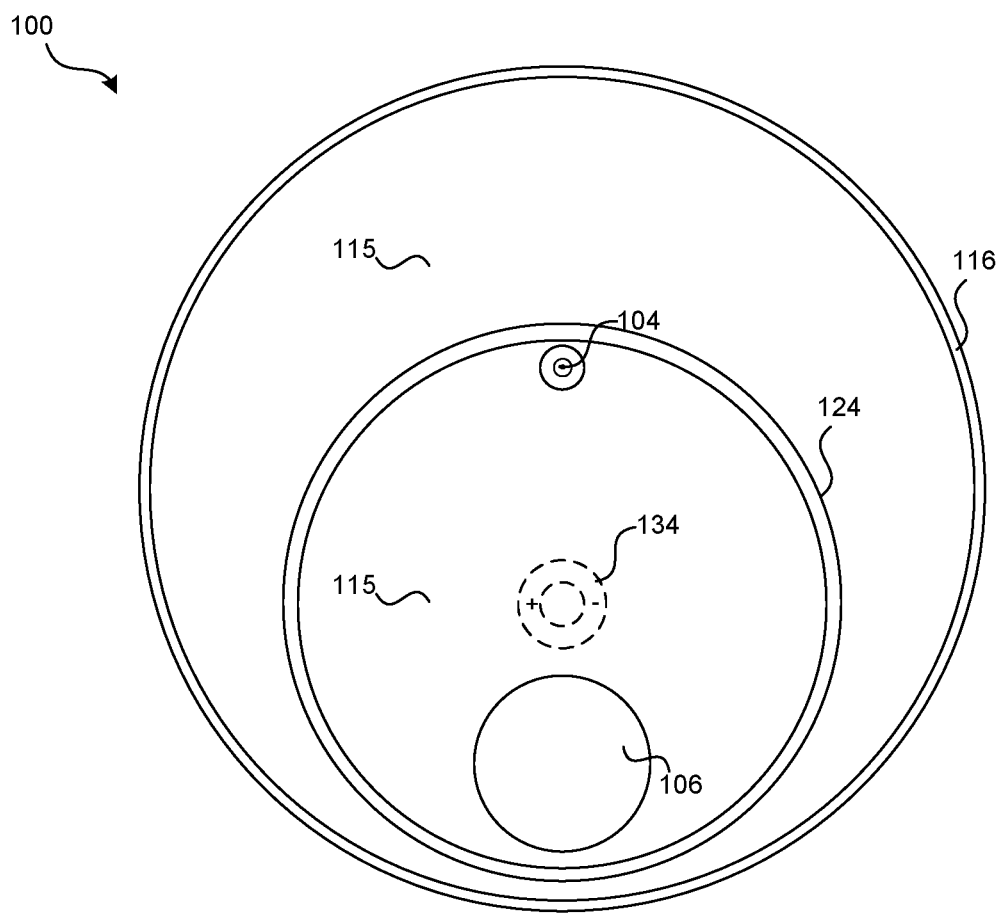
FIG. 9A is a schematic bottom plan view of a cap showing a top interior without a blocker, in accordance with embodiments of the disclosed technology.
Figure 9B:
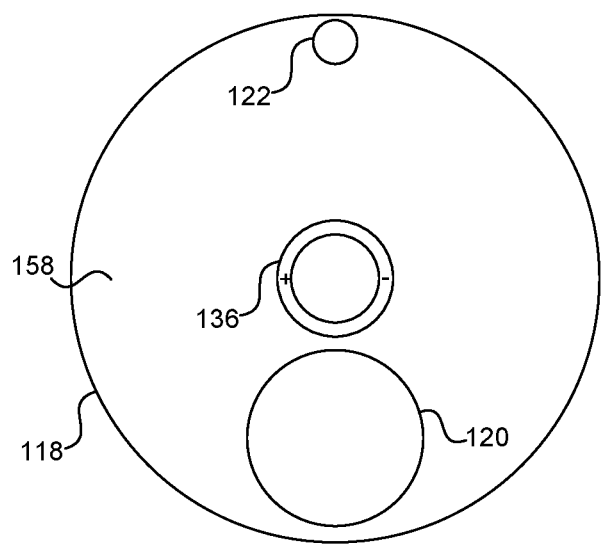
FIG. 9B is a schematic bottom plan view of a blocker showing a cap facing side of the blocker, in accordance with embodiments of the disclosed technology.

FIG. 9A is a schematic bottom plan view of the cap 100 without the blocker 118, and FIG. 9B is a schematic bottom plan view of the blocker 118, showing a cap-facing side 158 of the blocker 118. The cap-facing side 158 of the blocker 118 can be configured to be arranged to face and be in contact with the top interior 115 of the cap. FIG. 9A shows a cap attachment component 134 comprising a magnet, represented in dashed lines, showing where the cap attachment component 134 is configured in a cap compartment (not shown) of the cap 100, between the top interior 115 and top exterior (not shown). The cap attachment component 134 can be configured concentric with the blocker guide 124.

The blocker 118 can comprise a blocker attachment component 136 configured concentrically with the blocker 118. The blocker attachment component 136 can comprise a magnet and can be configured to magnetically couple with the cap attachment component 134. The magnetic coupling between the blocker attachment component 136 and the cap attachment component 134 can force the blocker 118 against the top interior 115 of the cap 100. In some embodiments, the blocker attachment component 136 can comprise a food-safe coating.

In some embodiments, the blocker 118 can be configured to comprise the blocker attachment component 136 embedded completely within the blocker 118. For example, a blocker attachment component 136 comprising a magnet can be placed in a mold for plastic injection used for creating the blocker 118. After injection of plastic comprising the blocker 118, the blocker attachment component 136 can be configured encapsulated within the blocker 118.

The magnetic coupling between the blocker attachment component 136 and the cap attachment component 134 can be leveraged for forcing the blocker 118 to rotate between the blocked and unblocked positions. For example, in some embodiments, the cap attachment component 134 can be coupled to a blocker mover component (not shown) comprising a motor that can be configured to rotate the cap attachment component 134, forcing the magnetically coupled blocker attachment component 136 to correspondingly rotate, thereby causing the blocker 118 to rotate.

FIG. 9A also shows the equalization vent 104 and the spout orifice 106 of the cap 100. FIG. 9B shows the equalization vent hole 122 and the spout hole 120.

Figure 10:
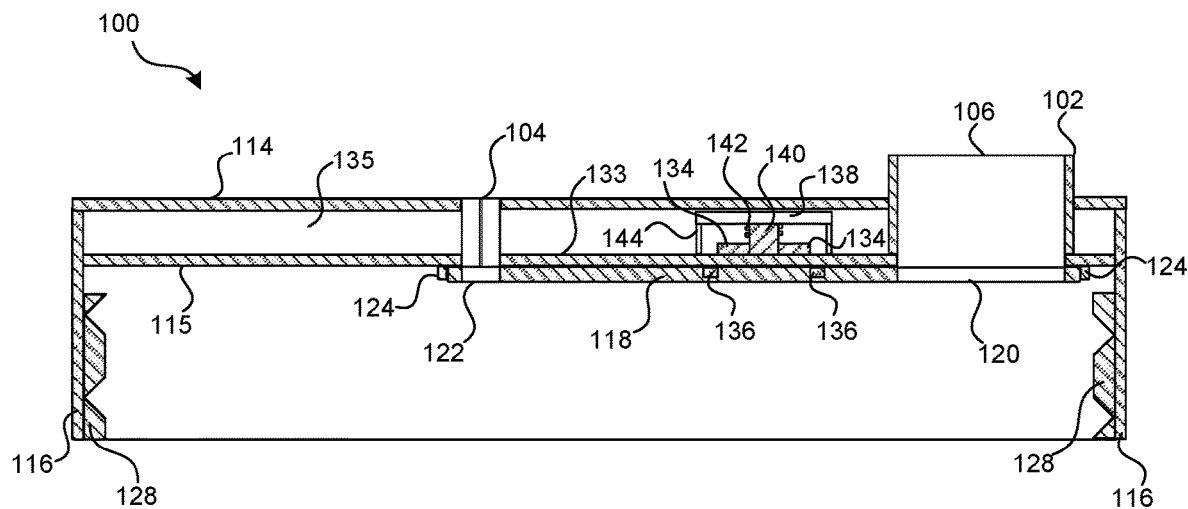
FIG. 10 is a schematic cross-sectional side plan view of a cap taken along line A-A of FIG. 3, in accordance with embodiments of the disclosed technology.

FIG. 10 is a schematic cross-sectional side plan view of the cap 100 taken along the line A-A shown in FIG. 3. The cap 100 comprises the side wall 116, the top exterior 114, and the top interior 115. As shown in FIG. 10, in some embodiments, the cap 100 is configured to comprise a cap compartment 135 defined at least in part by the top exterior 114 and the top interior 115. The cap compartment 135 can be configured to comprise the blocker mover component comprising a motor 138 and a rotation spindle 140. In some embodiments, the motor 138 can be configured to force the rotation spindle 140 to rotate. In some embodiments, the rotation spindle 140 can comprise a metal, such as 304 Stainless Steel. In some embodiments, the rotation spindle 140 can comprise carbon steel, nickel, or steel alloy.

The rotation spindle 140 can be configured attached to the cap attachment component 134. As shown in FIG. 10, the cap attachment component 134 can be configured to be coupled with the blocker attachment component 136 of the blocker 118. For example, as shown in FIG. 10, in some embodiments, the cap attachment component 134 can comprise a magnet and the blocker attachment component 136 can comprise a magnet, and the cap attachment component 134 and the blocker attachment component 136 can be magnetically coupled. In some embodiments, the cap attachment component 134 can comprise multiple magnets. In some embodiments, the blocker attachment component 136 can comprise multiple magnets. The motor 138 can be configured to force the rotation spindle 140 to rotate, causing the cap attachment component 134 to rotate. Rotation of the cap attachment component 134 causes the blocker attachment component 136 to rotate and, accordingly, the blocker 118 as well. Accordingly, the cap 100 can be configured to cause the blocker 118 to rotate between blocked and unblocked positions.

In some embodiments, as shown in FIG. 10, the motor 138 can be configured to rotate the rotation spindle 140 in one direction, and the rotation spindle 140 can comprise a return component 142 configured to cause the rotation spindle 140 to rotate in the opposite direction. For example, in some embodiments, the motor 138 can be configured to force the rotation spindle 140 in a counterclockwise rotation and the return component 142 can be configured to force the rotation spindle 140 in a clockwise rotation. By rotating the cap attachment component 134 using the motor 138, the cap 100 can be configured to force the blocker 118 into the unblocked position, and the return component 142 can be configured to force the blocker 118 into the blocked orientation. In some embodiments, as shown in FIG. 10, the return component 142 can comprise a spring. In some embodiments, the motor 138 can comprise a DC motor. In some embodiments, the motor 138 can comprise a motor that can rotate in precise movements, such as a stepper motor, and the rotation component does not comprise the return component 142. For example, in some embodiments, the motor 138 can be configured to move the blocker 118 in precise movements in order to rotate the blocker 118 between the unblocked and blocked positions.

The motor 138 can be configured mounted to at least one of the top exterior 114 and the top interior 115. For example, as shown in FIG. 10, in some embodiments, the motor 138 can be mounted to a cap compartment side 133 of the top interior 115 via motor mounts 144. In some embodiments, the motor mounts 144 comprise a screw attachment for attaching to the top interior 115. In some embodiments, the motor mounts 144 can be glued to the cap compartment side 133 of the top interior 115. The cap attachment component 134 can be glued or otherwise adhered to the rotation spindle 140, and the cap attachment component 134 can be arranged within the cap compartment 135 adjacent to the cap compartment side 133 of the top interior 115 such that that the cap attachment component 134 can magnetically couple with the blocker attachment component 136 opposite the top interior 115. In some embodiments, the cap attachment component 134 can comprise an attachment holder (not shown) configured to physically couple the attachment component 134 comprising a magnet with the rotation spindle 140. For example, in some embodiments, an attachment holder (not shown) can comprise a plastic disk that can be sleeved over and glued to the spindle 140, and the plastic disk can be configured to include the attachment component 134 comprising at least one magnet.

FIG. 10 shows the spout 102 and spout orifice 106, which extends from the top exterior 114, through the cap compartment 135, and through the top interior 115. FIG. 10 also shows the equalization vent 104, which also extends from the top exterior 114, through the cap compartment 135, and through the top interior 115. FIG. 10 shows the blocker 118, which is in an unblocked position, with the spout hole 120 aligned with the spout orifice 106 and the equalization vent hole 122 aligned with the equalization vent 104.

Figure 11:
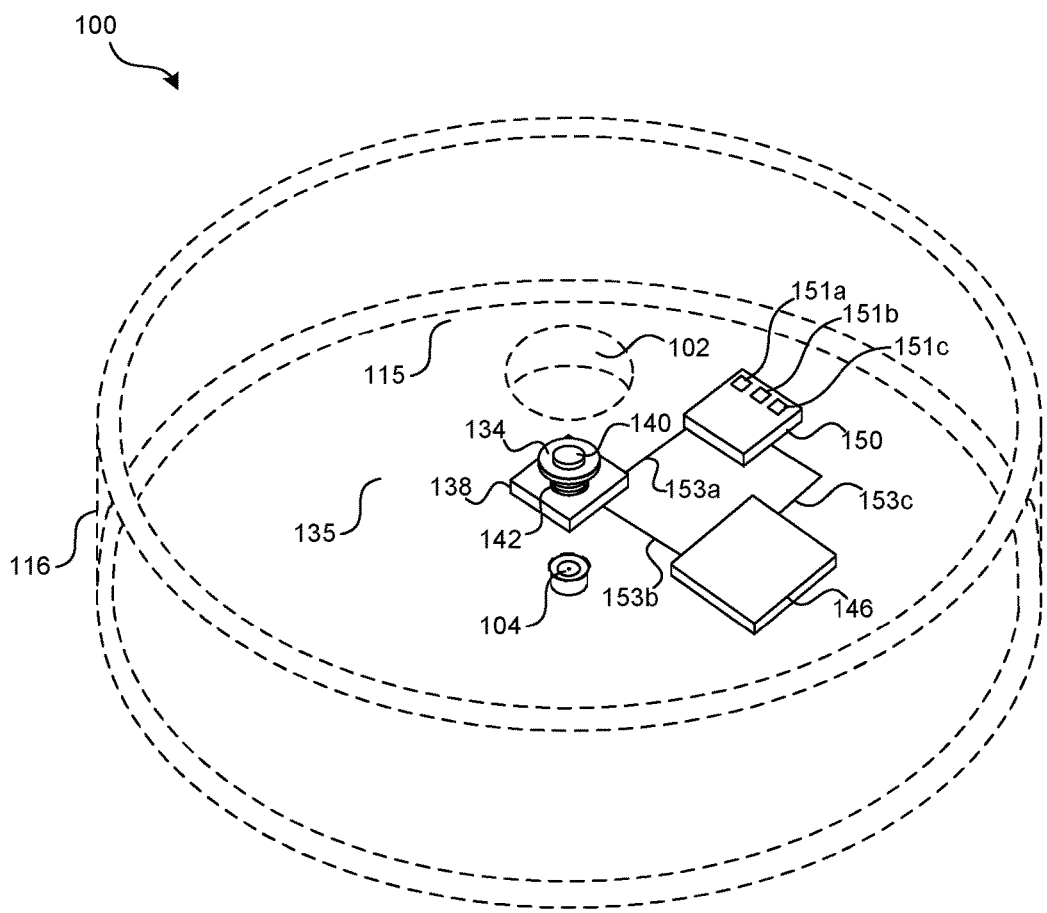
FIG. 11 is a schematic isometric view of a cap showing contents of a cap compartment including a blocker mover component and a cap controller component, in accordance with embodiments of the disclosed technology.

FIG. 11 is a schematic isometric view of the cap 100, including various components of the cap compartment 135. The side wall 116, top interior 115, and spout 102 shown, for example, in FIG. 8, are outlined in dashed lines to indicate that these features are depicted transparent in FIG. 11, while other components, including those in the cap compartment 135, are shown in solid line.

In some embodiments, as shown in FIG. 11, the cap 100 can be configured to comprise a cap controller component 150. Additionally, in some embodiments, as shown in FIG. 11, the cap 100 can be configured to comprise a battery 146. The battery 146 can be electrically coupled with the motor 138 and the cap controller component 150, and the battery 146 can be configured to power the motor 138 and the cap controller component 150. FIG. 11 shows the battery 146, the motor 138, and the cap controller component 150 electrically coupled to one another via connectors 153a-c. In some embodiments, the cap 100 can be configured to comprise at least one sensor coupled to the cap controller component 150 and configured to provide sensed data comprising a use signal to the cap controller component 150. The cap controller component 150 can also be coupled to the motor 138. The cap controller component 150 can be configured to control the motor 138. In some embodiments, the cap controller component 150 can be configured to generate a blocking and/or an unblocking signal to control the motor 138.

The cap controller component 150 can comprise a circuit board including various sensors providing input to the cap controller component 150. For example, as shown in FIG. 11, the cap controller component 150 can comprise at least one orientation sensor (e.g., a gyroscope) 151a configured for providing a signal for determining an orientation of the cap 100 and/or container (not shown). In some embodiments, the cap controller component 150 can be configured to include at least one motion sensor 151b, such as an accelerometer and/or a magnetometer. The at least one motion sensor can be configured to provide a signal that can be used for measuring a vibration of the cap 100 and/or container. In some embodiments, the at least one motion sensor can be configured to measure an acceleration of the cap 100 and/or container. In some embodiments, the cap 100 can include other sensors as well that can be coupled to the cap controller component 150. For example, as described below with respect to FIG. 12, in some embodiments, the cap 100 can be configured to comprise at least one touch sensor (not shown).

In some embodiments, the circuit board of the cap controller component 150 can be configured to include at least one liquid volume sensor 151c, such as an ultrasonic volume sensor. The at least one liquid volume sensor can be configured to provide a signal that can be used for measuring the volume of liquid within the container (not shown). In some embodiments, the cap controller component 150 can be configured to block and unblock the spout orifice based on input from the volume sensor. For example, in some embodiments, when a container is determined to be nearly full based on input from the volume sensor, the controller can be configured to unblock the spout orifice 106 slowly, or only part way, so that liquid is prevented from splashing through the spout orifice 106. In some embodiments, the cap controller component 150 can be configured to use a volume measurement for analyzing vibrations sensed by a motion sensor of the cap 100, to determine, for example, whether liquid in an internal volume of a container may have a dampening effect on vibrations. In some embodiments, an electrical filter for a motion sensor can be adjusted based on the sensed volume.

The battery 146 can be configured to comprise a power management circuit, including a charging component. In some embodiments, the battery 146 can comprise a charging component configured to charge the battery 146 via inductive charging. In some embodiments, the cap 100 can comprise a charging port configured, for example, on the top exterior 114 of the cap 100, for charging the battery 146. For example, in some embodiments, the charging component can be configured to charge the battery 146 via a universal serial bus (USB). In some embodiments, the cap 100 can comprise a charging solar panel configured, for example, on the top exterior 114 of the cap 100, for charging the battery 146. In some embodiments, the battery 146 can comprise a lithium polymer battery, a lithium ceramic battery, or a lithium ion battery.

FIG. 11 also shows the cap attachment component 134 configured on the rotation spindle 140. The rotation spindle 140 includes the return component 142 configured between the motor 138 and the cap attachment component 134. In some embodiments, the return component 142 comprises a spring. FIG. 11 also shows the equalization vent 104, which extends through the cap compartment 135.

The cap 100 can be manufactured in various ways. In some embodiments, the top exterior 114, top interior 115 and sidewall 116 of the cap 100 can be formed by molding a plastic, such as PETE or HDPE. For example, with reference to FIG. 10, the side wall 116 and the top exterior 114 of the cap 100 can be formed as a single piece, the components of the cap compartment 135 can be arranged in the cap compartment 135, attached to at least one of the top interior 115 and the top exterior 114, and the top interior 115 can be affixed to the single piece comprising the side wall 116 and the top exterior 114. Cap affixing component 128 can then be arranged against and glued to the side wall 116. In some embodiments, the top interior 115 can be configured mechanically secured using, for example, mounting tabs and a silicone gasket. In some embodiments, as shown in FIG. 10, the spout 102 can be defined by the single piece comprising the side wall 116 and the top exterior 114. In some embodiments, the cap 100 can be formed by 3D printing.

In some embodiments, the cap controller component 150 and/or the battery 146 can be configured on a container, such as the container 108 shown in FIG. 1. For example, the cap 100 can be configured for capping an orifice of a container for heating a liquid, such as the container described in U.S. patent application Ser. No. 16/040,523, entitled LIQUID FOOD ITEM PRESERVATION AND PREPARATION. The container can comprise a battery and computing device that can be electrically coupled to the motor 138 and any sensors of the cap 100. In such embodiments, the cap can be configured to comprise an electrical interface for electrically coupling to the computing device and battery of the container, and the cap controller component can comprise the computing device of the container. In some embodiments, the container can comprise a touch sensor and/or other sensors providing input to the cap controller component.

Figure 12:
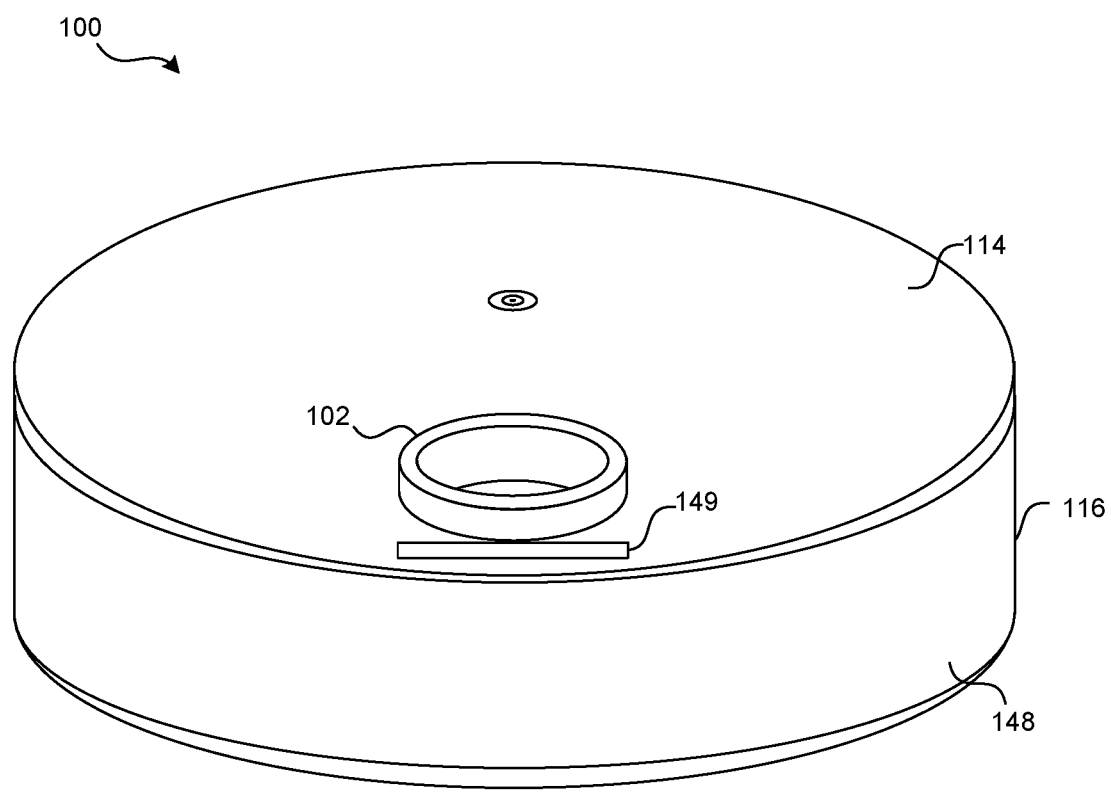
FIG. 12 is a schematic isometric view of a cap including touch sensors configured on a top exterior and side wall of the cap, in accordance with embodiments of the disclosed technology.

In some embodiments, the cap 100 can be configured to comprise at least one touch sensor. FIG. 12 is a schematic isometric view of the cap 100, showing the external top 114 and side walls 116. As shown in FIG. 12, in some embodiments, the cap 100 can be configured to comprise a spout touch sensor 149. The spout touch sensor 149 can be configured to detect a touch from a person's lips. Also as shown in FIG. 12, in some embodiments, the cap 100 can be configured to comprise a side wall touch sensor 148. The side wall touch sensor 148 can be configured to detect a touch from a person's finger or hand. In some embodiments, the spout touch sensor 149 can be arranged on the spout 102. In some embodiments, the side wall touch sensor 148 can be configured around the circumference of the side wall 116. In some embodiments, a touch sensor, such as the spout touch sensor 149 and/or the side wall touch sensor 148, can comprise at least one pressure sensor. In some embodiments, a touch sensor can comprise at least one capacitive touch sensor. In some embodiments, a touch sensor can comprise at least one resistive touch sensor. In some embodiments, a touch sensor can comprise at least one contact switch plate. Touch sensors, including the spout touch sensor 149 and side wall touch sensor 148, can be configured electrically coupled to the cap controller component (not shown).

FIG. 13A is a schematic exploded isometric view of a blocker mover component 160 of the cap 100 configured according to some embodiments. As shown in FIG. 13A, in some embodiments, the blocker mover component 160 can be configured to comprise the cap attachment component 134, the return component 142, the rotation spindle 140, and the motor 138. As shown in FIG. 13A, in some embodiments, the cap attachment component 134 can comprise a magnet.

FIG. 13B is a schematic isometric view of the blocker 118, showing a cap-facing side 158 of the blocker 118. As shown in FIG. 13B, the blocker 118 can be configured to comprise the blocker attachment component 136 configured recessed in the cap-facing side 158 of the blocker 118. As shown in FIG. 13B, the blocker attachment component 136 can comprise a magnet.

Figure 13C:
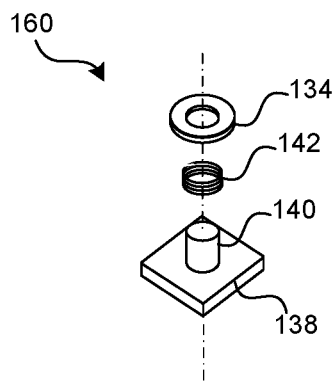
Figure 13C:
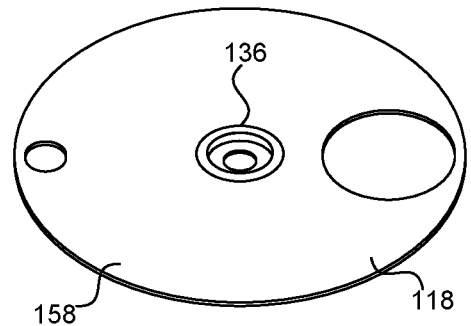
Figure 13C:
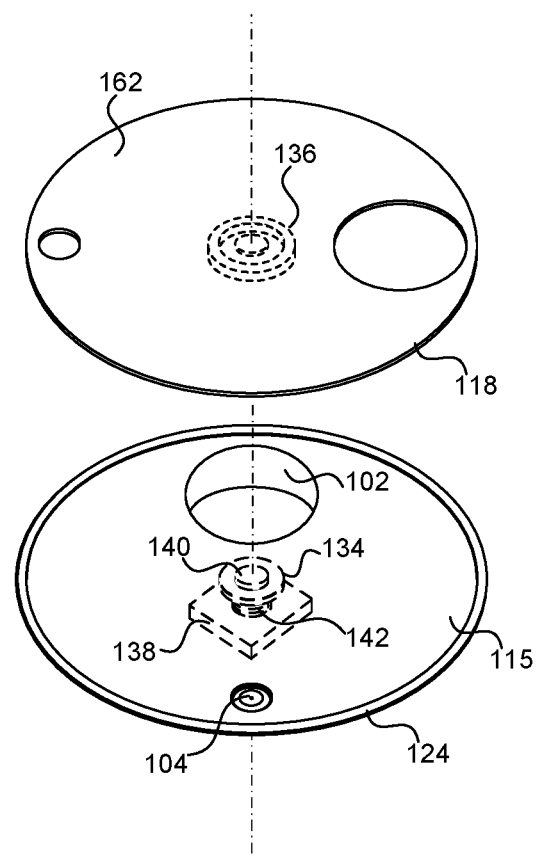

FIG. 13C is a schematic exploded isometric view of a portion of the interior top 115 of the cap 100 within the blocker guide 124 and the blocker 118, showing a non-cap-facing side 162 of the blocker 118. The blocker attachment component 136 is depicted by dashed lines, showing where it is configured on the cap-facing side (not shown in FIG. 13C) of the blocker 118. The blocker mover component 160 is depicted in dashed lines, showing where it is configured within the cap compartment (not shown) of the cap 100.

FIG. 14A is a schematic isometric view of a blocker mover component comprising an electromagnet 164 configured according to some embodiments. As shown in FIG. 14A, in some embodiments, the blocker mover component comprising the electromagnet 164 can comprise e a cap attachment component. In some embodiments, the blocker mover component comprising the electromagnet 164 can be coupled to the cap controller component (not shown) and the battery (not shown) which can be configured to power the electromagnet 164. In some embodiments, the electromagnet 164 can be configured to comprise at least one metal core wrapped in coil. The cap controller component (not shown) can be configured to generate a blocking signal comprising a current applied to the at least one coil to induce a magnetic field. The cap controller component (not shown) can be configured to control a voltage, voltage polarity, and current to the at least one coil of the electromagnet 164 to control the direction and strength of the magnetic field generated by the electromagnet 164. Based on the applied voltage across the coil, the cap controller component can be configured to induce an opposing or attracting force on the magnetically coupled blocker attachment component 136 (not shown in FIG. 14A), causing the blocker 118 (not shown in FIG. 14A) to rotate between the blocked and unblocked positions. In some embodiments, the cap 100 can be configured such that a force exerted by the electromagnet 164 rotates the blocker (not shown in FIG. 14A) to the unblocked position, and the blocker 118 is configured to rotate back to the blocked position based on a magnetic force between a magnet (not shown) of the blocker 118 and a static magnet (not shown) of the cap 100 when a voltage is no longer applied across the at least one coil.

FIG. 14B is a schematic isometric view of the blocker 118, showing the cap-facing side 158 of the blocker 118. As shown in FIG. 14B, the blocker 118 can be configured to comprise the blocker attachment component 136 configured recessed in the cap-facing side 158 of the blocker 118. In some embodiments, the blocker 118 can be configured to comprise the blocker attachment component 136 configured embedded within the blocker 118. As shown in FIG. 14B, the blocker attachment component 136 can comprise a magnet.

Figure 14C:
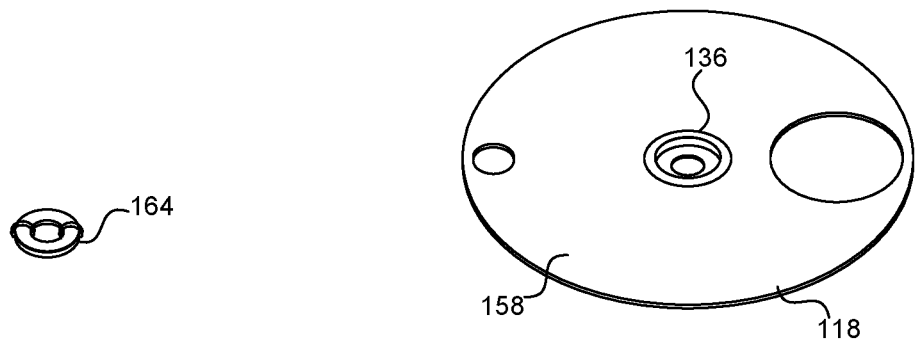
Figure 14C:
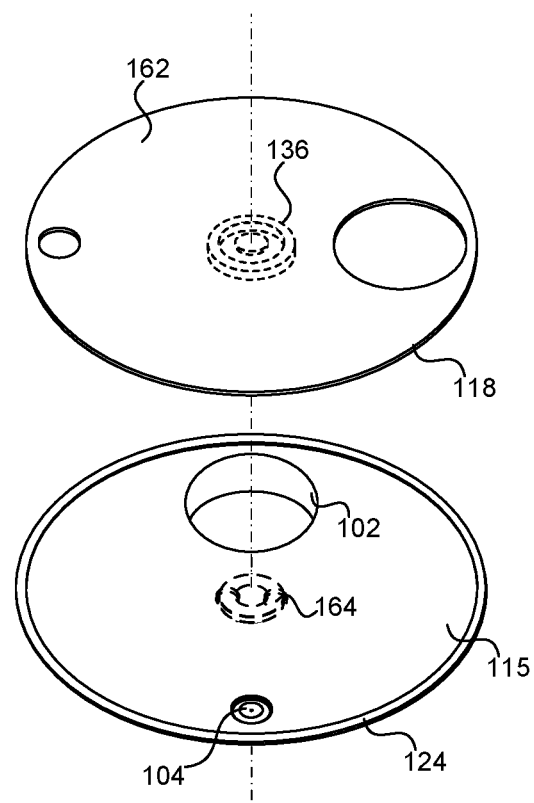

FIG. 14C is a schematic exploded isometric view of the interior top 115 of the cap 100 within the blocker guide 124 and the blocker 118, showing the non-cap-facing side 162 of the blocker 118. The blocker attachment component 136 is depicted by dashed lines, showing where it is configured on the cap-facing side (not shown) of the blocker 118. The blocker mover component comprising the electromagnet 164 is depicted in dashed lines, showing where it is configured within the cap compartment (not shown) of the cap 100.

FIG. 15A is a schematic exploded isometric view of a blocker mover component 168 configured according to some embodiments. The blocker mover component 168 comprises a cap attachment component 170 comprising a mechanical attachment mechanism. As shown in FIG. 15A, in some embodiments, the cap attachment component 170 comprising a mechanical attachment mechanism can comprise at least one male attachment part 174. As shown in FIG. 15A, in some embodiments, the blocker mover component 168 can be configured to comprise the return component 142, the rotation spindle 140, and the motor 138. The motor 138 can be configured to rotate the rotation spindle 140, causing the cap attachment component 170 comprising the mechanical attachment mechanism to rotate.

FIG. 15B is a schematic isometric view of the blocker 118, showing the cap-facing side 158 of the blocker 118. As shown in FIG. 15B, the blocker 118 can be configured to comprise a blocker attachment component 172 comprising a mechanical attachment mechanism. As shown in FIG. 15B, in some embodiments, the blocker attachment component 172 comprising the mechanical attachment mechanism can comprise at least one female attachment part 176 that can be configured recessed in the cap-facing side 158 of the blocker 118, and configured to receive the male attachment part 174 of the cap attachment component 170.

FIG. 15C is a schematic exploded isometric view of the interior top 115 of the cap 100 within the blocker guide 124 and the blocker 118, showing the non-cap-facing side 162 of the blocker 118. The blocker attachment component 172 is depicted by dashed lines, showing where it is configured on the cap-facing side 158 of the blocker 118. The return component 142, the rotation spindle 140, and the motor 138 are depicted in dashed lines, showing where they are configured within the cap compartment (not shown) of the cap 100. As shown in FIG. 15C, in some embodiments, the cap attachment component 170 can be configured outside the cap compartment (not shown) on a surface of the top interior 115 that is opposite the cap compartment. Indeed, in some embodiments, the cap 100 can be configured to include a hole (not shown) through which at least a portion of the rotation spindle 140 is configured to penetrate, and the cap attachment component 170 can be configured to attach to the rotation spindle 140 outside the cap compartment. The cap attachment component 170 can be configured to physically couple with the blocker attachment component 172 by the at least one male attachment part 174 entering the at least one female attachment part 176.

Figure 16:
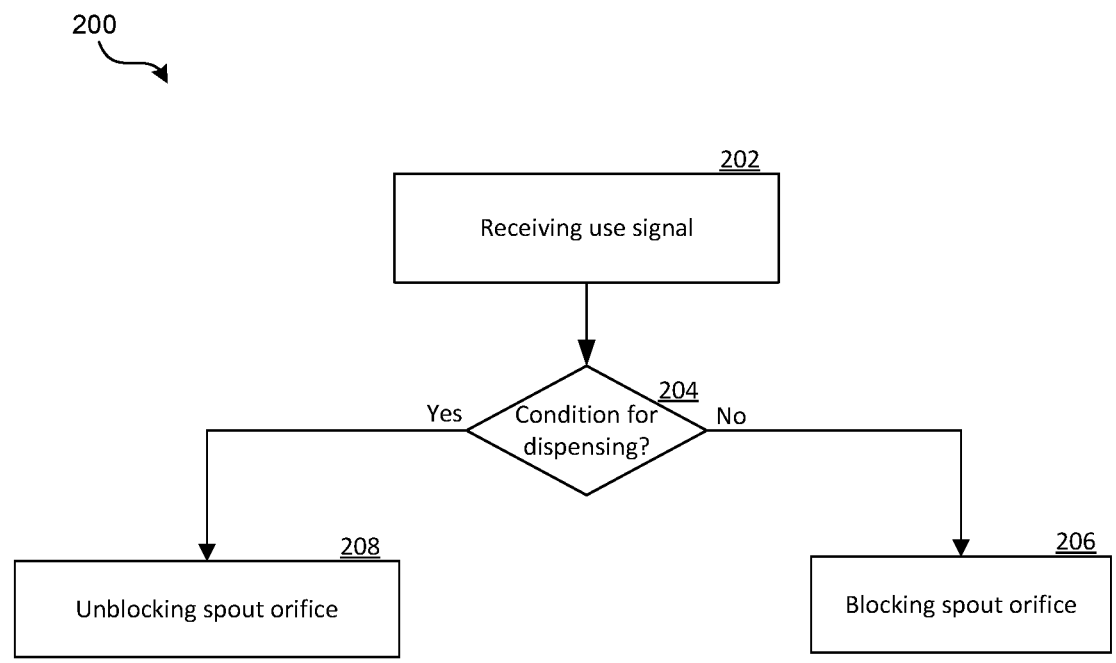
FIG. 16 is a flowchart illustrating a process of blocking or unblocking a spout orifice based at least in part on a condition of a cap and/or container, in accordance with embodiments of the disclosure.

FIG. 16 is a flow diagram of a process 200 that can be implemented by the cap 100 for blocking or unblocking an orifice of a container to which the cap 100 is affixed. The process 200 can be implemented, at least in part, by the cap controller component 150 shown in FIG. 11. At a block 202, the process can include receiving a use signal. A use signal can comprise data, a measurement, or another signal from a sensor of the cap 100. For example, in some embodiments, a use signal can comprise input from an orientation sensor, such as a gyroscope, configured to provide a signal indicative of an orientation of the container. In some embodiments, a use signal can comprise input from a motion sensor configured to provide a signal indicative of a motion of the container. For example, in some embodiments, a use signal can comprise input from an accelerometer configured to provide a signal indicative of a motion of the container, which can be used for determining whether a hand is holding the container. In some embodiments, a use signal can comprise input from a touch sensor. In some embodiments, a use signal can comprise input from a volume sensor.

At a decision block 204, the cap 100 can be configured to determine whether a condition for dispensing contents of the container is met. In some embodiments, the cap 100 can be configured to determine whether a condition for dispensing contents of the container is met by comparing predefined condition data with received use signal. In some embodiments, when the use signal meets the predefined condition data, the cap can be configured to determine that the condition for dispensing contents of the container is met. In some embodiments, when the use signal does not meet the predefined condition data, the cap can be configured to determine that the condition for dispensing contents of the container is not met.

In some embodiments, a condition for dispensing contents of the container can be a predefined frequency of vibration of the cap, as sensed by a motion sensor. For example, a predefined frequency of vibration of the cap can be a frequency typically sensed when a person is holding the cap. In some embodiments, a condition for dispensing contents of the container can be a predefined sensed touch received by a touch sensor. For example, a predefined sensed touch received by a touch sensor can correspond to a touch by a person's lips in drinking from the cap. In some embodiments, a condition for dispensing contents of the container can be a predefined orientation of the container. In some embodiments, a condition for dispensing contents of the container can be a predefined acceleration of the container. For example, a predefined acceleration of a container can be associated with a drop of the container. In some embodiments, a condition for dispensing contents of the container can be determined based on machine learning. In some embodiments, a condition for dispensing contents of the container includes that a condition for blocking the orifice of the container is not met. For example, a condition for blocking the orifice of the container can comprise an emergency condition, such as a drop of the container.

If it is determined that no condition is met for dispensing of the contents of the container, the process 200 proceeds to a block 206, and the process 200 includes the cap 100 entering a blocked state. In some embodiments, to enter the blocked state, the blocker can be moved into a blocked position or remain in a blocked position. In some embodiments, the blocker is in the blocked position by default.

If a condition is met for dispensing of the contents of the container, the process 200 proceeds to a block 208, and the process 200 includes the cap 100 entering an unblocked state. In some embodiments, to enter the unblocked state, the blocker can be moved into an unblocked position.

Figure 17:
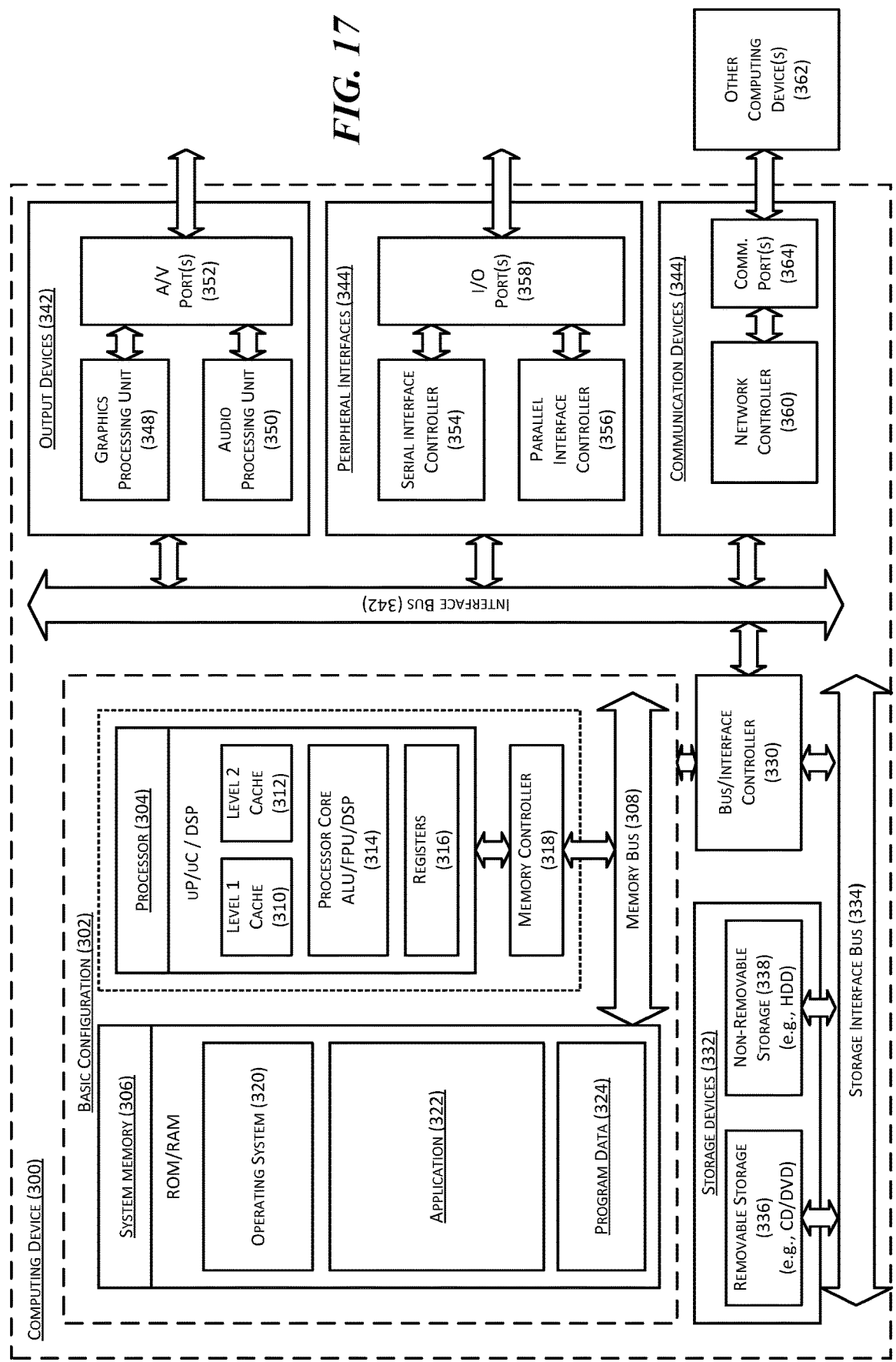
FIG. 17 is a computing device suitable for certain components in FIGS. 1-16.

FIG. 17 is a computing device 300 suitable for certain components of the cap in FIGS. 1-16, including the cap controller component 150. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of the cap 100. In some embodiments, the computing device 300 can be implemented as a portion of the container 108 shown in FIG. 1. The cap 100 and/or container 108 can be configured to comprise ports as needed. The computing device 300 can be implemented as a portion of small-form factor portable (or mobile) electronic device, an application specific device, or a hybrid device that include any of the above functions.

Specific embodiments of the technology have been described above for purposes of illustration. However, various modifications can be made without deviating from the foregoing disclosure. For example, in some embodiments, a cap can comprise a washer configured around a perimeter of a top interior of the cap for sealing between the cap and a container to which it is affixed. In addition, many of the elements of one embodiment can be combined with other embodiments in addition to or in lieu of the elements of the other embodiments. Accordingly, the technology is not limited except as by the appended claims. Furthermore, even if not labeled as such, Figures may not be drawn to scale.

I claim:

1. A cap configured to selectively block an orifice of a container, the cap comprising:
    an affixing component configured to affix the cap to a container orifice of a container;
    a top interior comprising a top interior surface facing an inner volume of the container when the cap is affixed to the container orifice via the affixing component,
        wherein the top interior comprises a cap orifice configured to pass a liquid from the inner volume of the container to an exterior of the container when the cap is affixed to the container orifice;
    a blocker releasably attached to the top interior surface, the blocker configured to block the cap orifice when in a blocked position from passing the liquid from the inner volume of the container through the cap orifice to the exterior of the container;
    a blocker mover component coupled to the blocker, the blocker mover component configured to move the blocker between the blocked position and an unblocked position in response to a blocker control signal,
        wherein in the unblocked position the blocker is not blocking the cap orifice from passing the liquid from the inner volume of the container through the cap orifice to the exterior of the container, and
        wherein the blocker is releasably attached to the top interior surface when in the blocked position and when in the unblocked position;
    a use sensor configured to generate a use signal based at least in part on a sensed condition; and
    a cap controller component, the cap controller component comprising a processor and a memory, the processor configured to execute instructions stored in the memory, the instructions comprising:
        receiving the use signal from the use sensor;
        comparing the use signal to a predefined use condition;
        determining, based at least in part on the comparison, whether the use signal meets the predefined use condition;

in response to determining that the use signal meets the predefined use condition, generating the blocker control signal for the unblocked position of the blocker; and in response to determining that the use signal does not meet the predefined use condition, generating the blocker control signal for the blocked position.

2. The cap of claim 1, wherein the use sensor comprises at least one orientation sensor configured to generate a use signal comprising data describing an orientation of the container.

3. The cap of claim 1, wherein the use sensor comprises at least one motion sensor configured to generate a use signal comprising data describing a motion of the container.

4. The cap of claim 1, wherein the use sensor comprises at least one touch sensor configured to generate a use signal comprising data describing a touch or an absence of touch on the touch sensor.

5. The cap of claim 1, wherein:
the use sensor comprises an orientation sensor, a motion sensor, and a touch sensor, and
the sensed condition comprises an orientation of the container, a motion of the container, and a touch or an absence of touch on the touch sensor.

6. The cap of claim 1, wherein the blocker mover component comprises a motor configured to move the blocker between the blocked position and the unblocked position.

7. The cap of claim 1, wherein:
the blocker mover component comprises a cap attachment component comprising a magnet;
the blocker comprises a blocker attachment component comprising a magnet; and
the blocker is releasably attached to the top interior surface by magnetic force between the cap attachment component and the blocker attachment component.

8. The cap of claim 6, wherein:
the blocker mover component comprises a cap attachment component comprising a mechanical attachment mechanism;
the blocker comprises a blocker attachment component comprising a mechanical attachment mechanism; and
the cap attachment component and the blocker attachment component are physically coupled.

9. The cap of claim 1, wherein:
the blocker mover component comprises a cap attachment component comprising an electromagnet;
the blocker comprises a blocker attachment component comprising a magnet;
the blocker is releasably attached to the top interior surface by magnetic force between the cap attachment component and the blocker attachment component; and
the cap attachment component comprising the electromagnet is configured to move the blocker between the blocked and the unblocked positions in response to the cap controller component applying a voltage across a coil of the electromagnet.

10. The cap of claim 1, further comprising:
an equalization vent, the equalization vent configured to pass a gas from outside the container to the inner volume of the container; and
an equalization vent blocker configured to block the equalization vent when in a blocked position.

11. The cap of claim 1, wherein the blocker comprises a spout hole configured to align concentrically with the spout orifice when the blocker is in the unblocked position.

12. The cap of claim 10, wherein the blocker comprises an equalization vent hole configured to align concentrically with the equalization vent when the blocker is in the unblocked position.

13. The cap of claim 1, wherein the blocker mover component comprises a return component comprising a spring, the return component configured to return the blocker to the blocked position from the unblocked position.

14. The cap of claim 3, wherein the predefined use condition comprises a frequency of motion associated with a human holding the container.

15. The cap of claim 1, wherein the user sensor comprises at least one volume sensor configured to generate a use signal comprising data describing a volume of liquid contained in the inner volume of the container.

16. A cap configured to automatically block an orifice of a container, the cap comprising:
a top interior comprising a top interior surface facing an inner volume of a container to which the cap is affixed;
a spout comprising a spout orifice, the spout orifice configured to pass a liquid from the inner volume of the container to an exterior of the container;
a blocker releasably attached to the top interior surface, the blocker comprising a spout hole, the blocker configured to block the spout orifice when in a blocked position from passing the liquid from the inner volume of the container through the spout orifice to the exterior of the container;
a blocker mover component coupled to the blocker, the blocker mover component configured to move the blocker between the blocked position and an unblocked position in response to a blocker control signal,
wherein the blocker mover component is configured to move the blocker to the blocked position when the blocker control signal comprises a blocking signal and to the unblocked position when the blocker control signal comprises an unblocking signal,
wherein in the unblocked position the spout hole is aligned concentrically with the spout orifice,
wherein the blocker is releasably attached to the top interior surface when in the blocked position and when in the unblocked position;
a use sensor configured to generate a use signal based at least in part on a sensed condition; and
a cap controller component, the cap controller component comprising a processor and a memory, the processor configured to execute instructions stored in the memory, the instructions comprising:
providing to the blocker mover component a blocker control signal comprising the blocking signal;
receiving the use signal from the use sensor;
comparing the use signal to a predefined condition;
determining, based at least in part on the comparison, whether the use signal meets the predefined condition;
in response to determining that the use signal meets the predefined condition, generating the blocker control signal comprising the unblocking signal.

17. The cap of claim 16, wherein the instructions further comprise:
receiving the use signal from the use sensor;
comparing the use signal to a predefined condition;
determining, based at least in part on the comparison, whether the use signal meets the predefined condition;
in response to determining that the use signal meets the predefined condition, generating the blocker control signal comprising the blocking signal.

18. A method of automatically blocking an orifice of a container, the method performed by a cap device, the method comprising:
    sensing, by a sensor, a condition of a container to which a cap is affixed, the cap comprising a cap orifice to an internal volume of the container;
    determining, by a processor executing instructions stored in a memory, whether the sensed condition of the container comprises a non-consumption condition;
    in response to determining that the condition of the container comprises a non-consumption condition, generating, by the processor, a blocking signal; and
    rotating, by a blocker mover component, a blocker from an unblocked position, under which contents of the internal volume of the container can be passed from the internal volume through the cap orifice to outside the container, to a blocked position, under which the cap orifice is blocked by the blocker from passing contents of the internal volume of the container to outside the container,
        wherein the blocker is releasably attached to a top interior surface of the cap,
        wherein the blocker mover component is configured to move the blocker from the unblocked position to the blocked position by rotating the blocker while it is releasably attached to the top interior surface of the cap, and
        wherein the top interior surface of the cap faces the internal volume of the container.

19. The method of claim 18, further comprising:

in response to determining that the condition of the container comprises a consumption condition, generating, by the processor an unblocking signal; and moving, by the blocker mover component, the blocker to a position that does not block the cap orifice passing contents of the internal volume of the container to outside the container,
    wherein the blocker mover component is configured to move the blocker from the blocked position to the position that does not block the cap orifice by rotating the blocker while it is releasably attached to the top interior surface of the cap.

20. The method of claim 19, wherein the blocker comprises a blocker hole, and wherein moving, by the blocker mover component, the blocker to a position that does not block the cap orifice comprises rotating the blocker so that the blocker hole aligns concentrically with the cap orifice.

\* \* \* \* \*